US009963077B1

(12) United States Patent
Wu et al.

(10) Patent No.: US 9,963,077 B1
(45) Date of Patent: May 8, 2018

(54) GAP COVER ASSEMBLY IN A VEHICLE

(71) Applicant: Ford Global Technologies LLC, Dearborn, MI (US)

(72) Inventors: Harvey Wu, Nanjing (CN); Welton Chen, Nanjing (CN); Maisie Xu, Nanjing (CN); Kayla Zhao, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/713,221

(22) Filed: Sep. 22, 2017

(30) Foreign Application Priority Data

Oct. 21, 2016 (CN) .......................... 2016 1 0921963

(51) Int. Cl.
*B60R 5/04* (2006.01)
(52) U.S. Cl.
CPC ..................... *B60R 5/045* (2013.01)
(58) Field of Classification Search
CPC ...................................................... B60R 5/045
USPC .................................. 296/24.43, 24.4, 37.16
See application file for complete search history.

(56) References Cited

U.S. PATENT DOCUMENTS

| 4,198,091 | A | * | 4/1980 | Appleton | ............. | B60N 2/3022 |
| | | | | | | 296/37.16 |
| 4,489,660 | A | * | 12/1984 | Tamamushi | ............ | B60R 5/045 |
| | | | | | | 108/44 |
| 6,702,355 | B1 | * | 3/2004 | Price | ....................... | B60R 5/045 |
| | | | | | | 296/37.16 |
| 7,080,867 | B2 | | 7/2006 | Woerner et al. | | |
| 7,396,063 | B2 | | 7/2008 | Warsi et al. | | |
| 9,227,569 | B2 | | 1/2016 | Giorgis et al. | | |
| 2008/0030039 | A1 | * | 2/2008 | Sturt | .................... | B60N 2/3079 |
| | | | | | | 296/63 |

FOREIGN PATENT DOCUMENTS

DE    102008015351 A1    9/2009
WO       2015001247 A2    1/2015

* cited by examiner

*Primary Examiner* — Joseph D. Pape
(74) *Attorney, Agent, or Firm* — Vichit Chea; Mohr IP Law, PC

(57) ABSTRACT

A gap cover assembly in a vehicle comprises a gap cover, a first magnetic connection part disposed on a first end of the gap cover and a second magnetic connection part disposed on a seatback of a rear seat of the vehicle. The first end of the gap cover is adjacent to the seatback of the rear seat and the gap cover is connected with the seatback via a magnetic field between the first and second magnetic connection parts and is moveable relative to a front end of the package tray.

13 Claims, 3 Drawing Sheets

GAP COVER ASSEMBLY IN A VEHICLE

RELATED APPLICATION

This application claims the benefit of Chinese Patent Application No.: CN 201610921963.4 filed on Oct. 21, 2016, the entire contents thereof being incorporated herein by reference.

FIELD

This invention relates to a gap cover assembly in a vehicle, particularly, relates to gap cover to conceal a gap between a seatback of a rear seat and a package tray in a vehicle.

BACKGROUND

Rear seats in some vehicle may be equipped with a device to adjust a reclining angle and a seat height to improve user experience. For a rear seat with a reclining mechanism, a gap between a rear seat and a package tray of a rear window must be provided so that the rear seat can move relative to the package tray. A cover plate is commonly used to conceal the gap. For example, in the vehicle shown in FIG. 1, an end of a cover plate 1 is connected to a rear side of a rear seat 2, and another end of the cover 1 is connected to a package tray 3. However, if the cover plate 1 is fixed to the rear side of the rear seat 2, a height of the connection point relative to a vehicle floor will change when the rear seat reclines, which results in an inclination of the cover plate 1 and thus creates a gap between the cover plate 1 and the package tray 3. When an object falls into the gap, it is difficult for a user to dissemble the cover plate to retrieve the fallen object. If the cover plate 1 is slidably connected to the rear side of the rear seat 2, a rail or a connecting part may be exposed during movement of the rear seat, which affects the appearance. Thus, there is need for a gap cover assembly which provides detachable connection with a rear seat.

SUMMARY

According to one aspect, a gap cover assembly in a vehicle is provided. The gap cover assembly comprises a gap cover, a first magnetic connection part disposed on a first end of the gap cover and a second magnetic connection part disposed on a seatback of a rear seat of the vehicle. The first end of the gap cover is adjacent to the seatback of the rear seat and the gap cover is connected with the seatback via a magnetic field between the first and second magnetic connection parts and is moveable relative to a front end of the package tray.

In one embodiment, the first magnetic connection part is a permanent magnet connected to the first end of the gap cover, and the second magnetic connection part is made from ferromagnetic material.

In another embodiment, the second magnetic connection part is a metal plate including ferromagnetic material and disposed inside the seatback. The metal plate has a width extending along a widthwise direction of the seatback and a length at a height direction of the seatback. The second magnetic connection part is located adjacent to a top end of the seatback, and the length of the second magnetic connection part is configured to be greater than a moving path of the seatback relative to the first magnetic connection part.

In another embodiment, the first magnetic connection part includes an elongated permanent magnet connected to the first end of the gap cover or includes a plurality of permanent magnets spaced apart each other and connected to first end of the gap cover.

In another embodiment, the first magnetic connection part has a hemispheric shape at a side facing the second magnetic connection part, is fixed on the first end, and is moveable on the seatback as the seatback reclines.

In another embodiment, the first magnetic connection part is a rolling part rotatably connected to the first end of the gap cover and moves on the seatback as the seatback reclines.

In another embodiment, the gap cover is configured to translate between an extended position and a retracted position, wherein the first end of the gap cover is further away from a front end of the package tray at the extended position and the first end of the gap cover is closer to the front end of the package tray at the retracted position.

In another embodiment, the first magnetic connection part is connected to the first end of the gap cover, and the gap cover is wrapped with a decorative layer.

In another embodiment, the gap cover assembly further comprises a guide bracket under the package tray, wherein the gap cover is supported on the guide bracket and moveable relative to the guide bracket.

In another embodiment, the gap cover includes a guide groove on an inner surface and the guide groove is disposed along an extending and retracting direction of the gap cover relative to the package tray.

In another embodiment, the guide bracket includes a protrusion, a guide shaft raised from the protrusion, and a stop on an end of the guide shaft. The guide shaft is received in the guide groove, and a width of the guide groove is less than a cross-sectional width of the protrusion and the stop.

In another embodiment, the guide bracket is connected to an inner surface of the package tray, or the guide bracket is connected to a frame under the package tray.

In another embodiment, the guide bracket further includes a first guide bracket and a second guide bracket spaced apart from the first guide bracket. The first guide bracket and the second guide bracket are disposed under the package tray and covered by the package tray.

In another embodiment, the gap cover assembly further comprises a spring connected to the guide shaft and the gap cover to bias the gap cover at a direction to be retracted toward the package tray.

In another embodiment, the gap cover includes a recess on an outer surface for retaining an object, and the gap cover is formed from rigid material.

In another embodiment, the first end of the gap cover includes a projection protruded from a top surface.

In another embodiment, the first end of the gap cover includes a buffer layer wrapped around the first magnetic connection part.

According to another aspect of the present disclosure, a vehicle is provided to comprises a pivotable rear seat, a package tray spaced apart from the rear seat; and a gap cover assembly. The gap assembly includes a gap cover disposed under the package tray, a first magnetic connection part connected to a first end of the gap cover, and a second magnetic connection part disposed on a rear side of a seatback of the rear seat. The first magnetic connection part is coupled with second magnetic connection part via magnetic force such that the gap cover moves as the rear seat reclines while maintaining a connection with the seatback of the rear seat.

In one embodiment, an end of the package tray includes a side cover extending toward the rear seat, and the side cover includes a guide groove, and an edge portion of the gap cover is slidably received in the guide groove.

In another embodiment, the first magnetic connection part is a permanent magnet disposed on the first end of the gap cover, and the second magnetic connection part is a metal plate including ferromagnetic material and disposed on a rear side of the rear seat The gap cover assembly of the present disclosure comprises a gap cover, a first magnetic connection part and a second magnetic connection part. The gap cover is detachably connected to the rear seat of the vehicle to conceal a gap between the rear seat and the package tray. When the seat reclines, the first magnetic connection part slides on a rear side of the seatback to maintain a connection of the gap cover with the rear seat. The gap cover can be removed from the rear seat by pulling the first end of the gap cover away from the rear seat to overcome the attraction force created in the magnetic field. If an object falls into the gap, it is easy to separate the gap cover from the rear seat to retrieve the fallen object.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed gap cover assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various gap assembly are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
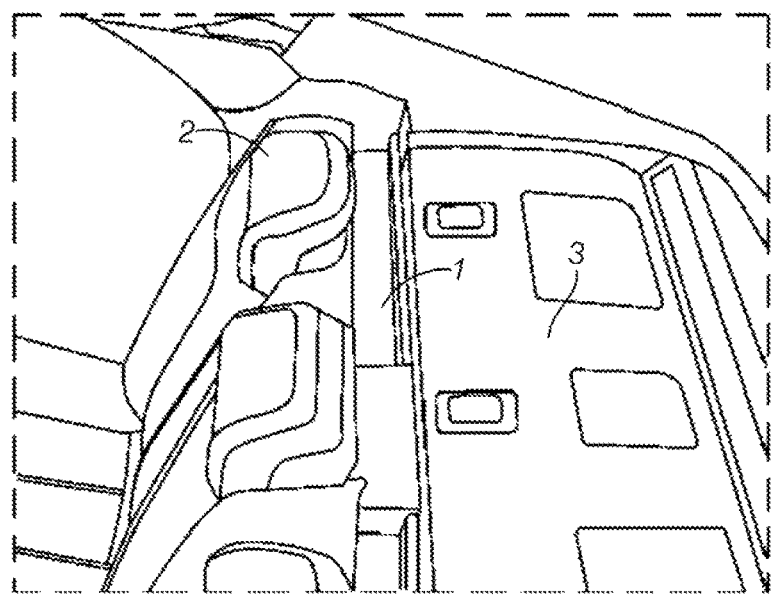
FIG. 1 shows a cover plate to conceal a gap between a rear seat and a package tray in a vehicle of prior art.
Figure 2A:
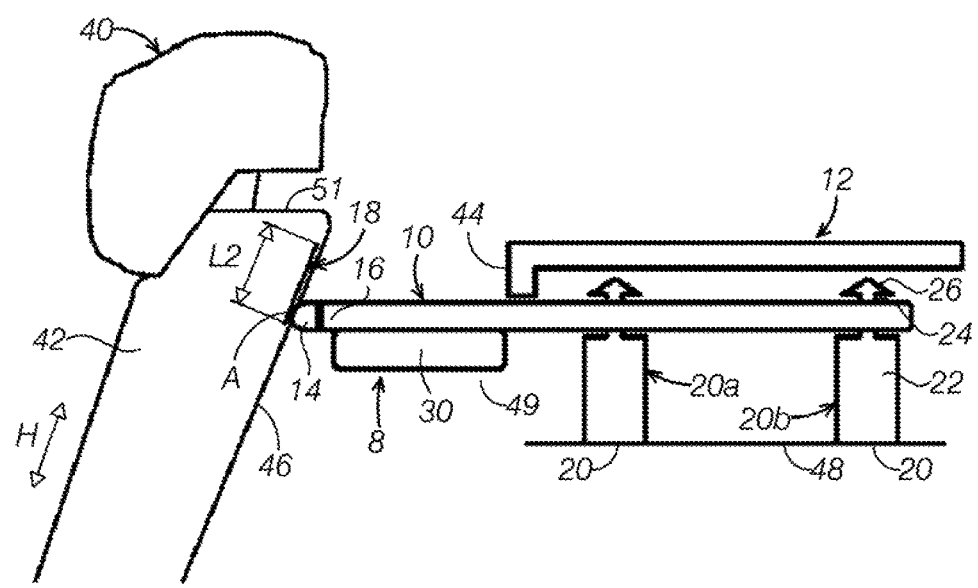
FIG. 2A is a cross-sectional view of a gap cover assembly according to one embodiment of the present disclosure, illustrating a seat at a first position.
Figure 2B:
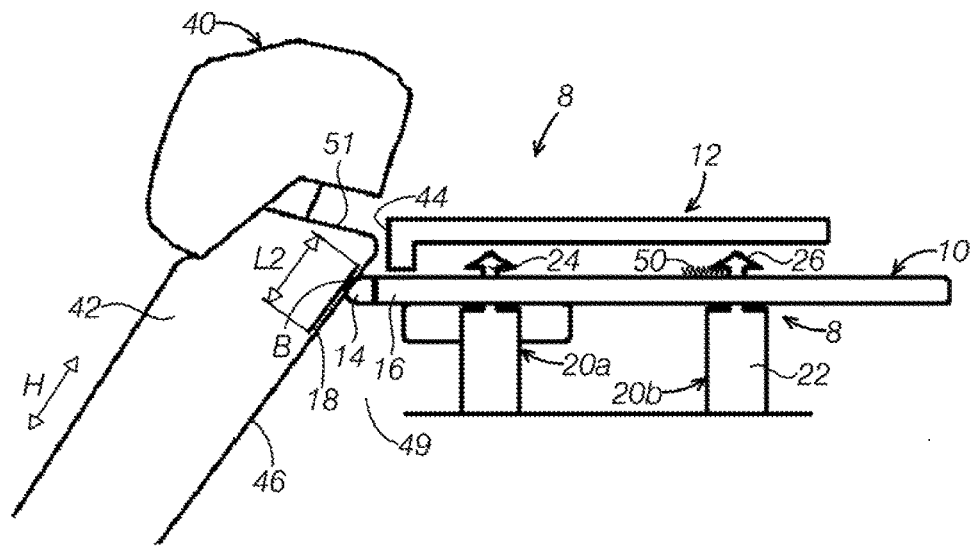
FIG. 2B is a cross-sectional view of a gap cover assembly according to one embodiment of the present disclosure, illustrating a seat at a second position.

Referring to FIGS. 2A and 2B, a gap cover assembly 8 in a vehicle is shown at a first position and a second position of a rear seat 40, respectively. The gap cover assembly 8 comprises a gap cover 10 disposed between a seatback 42 of the rear seat 40 and a package tray 12 of a rear window. The gap cover 10 is positioned under the package tray 12. In other words, the gap cover 10 is partially covered or concealed by a package tray. In some embodiments, the gap cover 10 is coupled to the rear seat 40. When the rear seat 40 reclines between the first position as shown in FIG. 1A and the second position as shown in FIG. 1B, the gap cover 10 moves with the rear seat 40 or extends or extracts relative to a front end 44 of the package tray 12. The gap cover assembly 8 includes a first magnetic connection part 14 disposed on a first end 16 of the gap cover 10. The first end of the gap cover 10 is adjacent to the rear seat 40 or is closer to the rear seat 40. The gap cover assembly 8 further includes a second magnetic connection part 18 disposed on a back side 46 of the seatback 42 of the rear seat 40 and detachably connected with first magnetic connection part 14. In other words, the gap cover 10 is at least partially covered by the package tray 12 and is extendable relative to the front end 44 of the package tray 12 between the first and second positions illustrated in FIGS. 2A and 2B. It should be understood that the two positions in FIGS. 2A and 2B are illustrative, and are not meant to limit the moving positions of the gap cover.

In the depicted embodiment above, the gap cover assembly 8 includes a first magnetic connection part 14 and a second magnetic connection part. These parts match each other, and cooperate to connect the gap cover 10 to the seatback 42 to conceal a gap 49 between the rear seat 40 and the package tray 12 while allowing the relative movement between the first and second magnetic parts 14, 16 and separation of the gap cover 10 from the rear seat 40 if needed. When the rear seat 40 reclines, the first magnetic connection part 14 moves on the back side 46 of the seat 40 in a height direction H (e.g., the movement between a position A shown in FIG. 2A and a position B shown in FIG. 2B) to maintain the connection of the gap cover 10 with the rear seat 40. The length of the second magnetic connection part 18 in the height direction H is configured to correspond to the reclining angle of the rear seat 40 such that the first magnetic connection part 14 and the second magnetic connection part 16 are coupled to each other during the reclining process of the rear seat 40. Either the first magnetic connection part 14 or the second magnetic connection par 16 or both first and second magnetic connection parts may include a permanent magnet which uses a magnetic field to maintain the connection of the gap cover 10 with the rear seat 40 during the movement of the rear seat 40. The permanent magnet is configured to have a strength to maintain the connection between the first and second magnetic connection parts during the seat reclining process while allowing a user to separate the gap cover 10 from the seat 40 by pushing the gap cover 10 away from the rear seat 40. In this way, the first magnetic connection part 14 and the second magnetic connection part 18 can be easily separated for the user to retrieve a fallen object.

The magnetic connection part refers to a magnetic connection part that can be connected to another magnetic connection part due to a magnetic field created by one of magnetic connection parts or both magnetic connection parts. In some embodiments, the first magnetic connection part 14 is a permanent magnet disposed on the first end 16 of the gap cover 10 and the second magnetic connection part 18 is a part made from ferromagnetic materials disposed on the rear side 46 of the seatback 42. For example, in one embodiment, the second magnet connection part 18 may be a metal plate including iron disposed on the rear side 46 of the seatback 42. Alternatively, in another embodiment, the second magnet connection pan 18 may be integrated on the seatback 42. In another example, the seatback 42 may include a metal sheet substantially covering the rear side 46. Alternatively, the first magnetic connection part 14 may be made from ferromagnetic material such as material including iron, and the second magnetic connection part 18 may be a permanent magnet. In yet another embodiment, both the first and the second magnetic connection parts are permanent magnets.

The first magnetic connection part 14 and the second magnetic connection part 18 may be configured as any appropriate shapes. For example, the first magnetic connection part 14 may have a smooth surface. In the depicted embodiment, the first magnetic connection part 14 has a hemispheric shape at a side facing the rear seat 40 or facing the second magnetic connection part 18. In another example, the first magnetic connection part 14 may have a surface matched with the second magnetic connection part 18 or a corresponding contour of the seatback 42. The second magnetic connection part 18 may have shape corresponding to a profile of the backside 46 of the rear seat 40, or the second magnetic connection part 18 may be configured as a rail corresponding to a moving path of the first magnetic connection part 14. The first magnetic connection part 14 and the second magnetic connection part 18 may be configured to have shape which can realize the connection of the second magnetic connection part 18 and the first magnetic connection part 14 and separation of the first magnetic pan 14 from the second magnetic part 18 upon application of a force.

In one embodiment, the second magnetic connection part 18 is a metal plate made from ferromagnetic material and disposed on the rear side 40 along a height direction H and widthwise direction W of the rear seat 40. In other words, the second magnetic connection part 18 has a width along the widthwise direction W of the rear seat 40 and a length L2 along the height direction H of the rear seat 40. In some embodiments, the second magnetic connection part 18 is disposed adjacent to a top end 51 of the seatback 42. The length L2 of the second magnetic connection part 18 is configured to be greater than a moving path of the seatback 46 relative to the first magnetic connection part 14. In other words, the first and second magnetic connection parts 14, 18 remain at the positions corresponding each other to be connected via the magnetic field. The second magnetic connection part 18 may be disposed inside the seatback 42 or concealed by a cover lay of the rear seat 40 and thus is not visible and provides integral appearance.

The first magnetic connection part 14 may include a permanent magnet and is magnetically connected to the second magnetic connection part 18 via the magnetic field. When the seat 40 moves forward or back relative to the package tray 12, the magnetic field keeps the first and second magnetic parts 14, 18 attached to each other while a contact point of the first magnetic part 14 on the seatback 42 changes (e.g., from position A to the position B).

In some embodiments, the first magnetic connection part 14 may be a fixed part on the first end 16 of the gap cover 10, and slidably connected with the second magnetic connection part 18. For example, the first magnetic connection part may be an elongated permanent magnet fixed to the first end 16 of the gap cover 10 by any appropriated approaches. In another embodiment, the first magnetic connection part 14 may be configured as a rolling part rotatably connected to the first end 16 of the gap cover 10. For example, the first magnetic connection part 14 may include a rod with a circular cross section and the rod extending along a widthwise direction WI of the gap cover and may be configured to rotate along its central axis. When the seat 40 moves between the first position and second position, the rotation of the first magnetic connection part 14 can facilitate its movement on the second magnetic connection part 18 or on the back side 46 of the rear seat 40. In addition, the rotation of the first magnetic connection part 14 can reduce friction between the first magnetic connection part 14 and the backside 46 of the seat 40 to assist the movement of the first magnetic connection parts 14 on the seatback 42. In some embodiments, the first magnetic connection part 12 may include a plurality of permanent magnets 14a, 14b, 14c along a widthwise direction WI as shown in FIG. 3B. The permanent magnets 14a, 14b, 14c have sufficient magnetic strength to maintain the connection of the gap cover 10 with the seatback 42 during the reclining process of the rear seat 40.

In some embodiments, the gap cover 10 is configured to translate between an extended position or the first position shown in FIG. 2A (i.e., the first end 16 is away from the front end 44 of the package tray 12) and a retracted position or at the second position shown in FIG. 2B (i.e., the first end 16 is closer to the front end 44 of the package tray 12). In other words, the gap cover 10 moves in a horizontal direction when the rear seat 40 reclines. When the gap cover 10 extends and retracts relative to the package tray 12 with the rear seat 40, a gap created between the gap cover 10 and the package tray 12 is concealed. Further, the gap cover 10 prevents an object placed on the gap cover 10 from falling into the gap. Moreover, it is convenient for the user to put the object on the object holding plate since the gap cover 10 is kept in a level position.

In some embodiments, the first magnetic connection part 14 is connected to the first end 16 of the gap cover 10, and the gap cover 10 is wrapped with a decorative layer. Thus, the gap cover 10 has a good appearance to provide a better user experience.

In some embodiments, the gap cover assembly 8 further comprises a guide bracket 20 disposed under the package tray 12 and covered by the package tray 12. The gap cover 10 is supported on the guide bracket 20 and is moveable relative to the guide bracket 20.

Figure 3A:
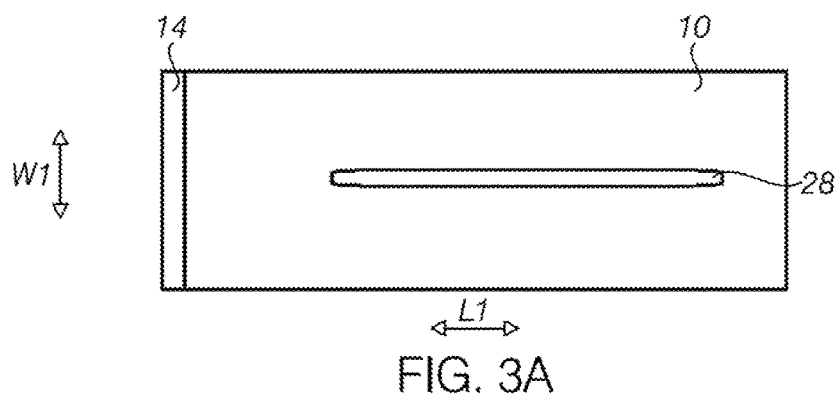
FIG. 3A is a plan view of a gap cover of a gap cover assembly according to one embodiment of the present disclosure.
Figure 3B:
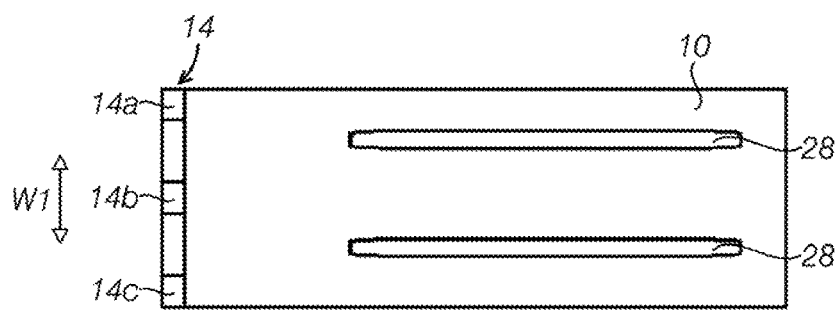
FIG. 3B is a plan view of a gap cover of a gap cover assembly according to another embodiment of the present disclosure.

Continuing with FIGS. 2A-2B and with further reference to FIGS. 3A-3B, the gap cover 10 includes a guide groove 28 along an extending and retracting direction of the gap cover 10 relative to the package tray 12 or a lengthwise direction L1. The guide bracket 20 is partially received in the guide groove 28. During movement of the gap cover 10, the guide groove 28 cooperates with the guide bracket 20 to prevent the gap cover 10 from being moved offset and colliding with other parts under the package tray 12.

In some embodiments, the guide bracket 20 includes a protrusion 22, a guide shaft 24 projecting from the protrusion 22, and a stop 26 on an end of the guide shaft 24. The guide shaft 24 is received in the guide groove 28, and a width of the guide groove 28 is less than a cross-sectional width of the protrusion 22 and a width of the stop 26. Thus, the stop 26 prevents a separation of the guide groove 28 with the guide shaft 24 when the vehicle travels over an uneven surface.

In some embodiments, the guide bracket 20 is connected to an inner surface of the package tray 12. That is, the guide bracket 20 is integrated with the package tray, which has a compact structure. In some embodiments as shown in FIG. 2A-2B, the guide bracket 20 is connected to a frame 48 under the package tray 12.

In some embodiments, the guide bracket 20 further includes a first guide bracket 20a and a second guide bracket 20b spaced apart from the first guide bracket 20a, which are disposed under the package tray 12 and covered by the package tray 12. The first guide bracket 20a and the second bracket 20b may be disposed along a moving direction of the gap cover 10 or a lengthwise direction L1 of the gap cover 10. It should be understood that the guide bracket 20 may be disposed at two sides of the gap cover 10, which is perpendicular to a moving direction of the object holding plate 10. The guide bracket 20 may include more than two guide brackets.

In the embodiment depicted in FIGS. 2A, 2B, 3A, the gap cover 10 includes one guide groove 28, and two guide brackets 20 disposed along an extending direction of the guide groove 28 or the length direction L1. The two guide brackets 20 cooperate with the guide groove 28 to smoothly guide the movement of the gap cover 10. In another example as shown in FIG. 3B, the gap cover 10 includes two parallel guide grooves 28, and one or more guide brackets 20 are disposed in each guide groove 28 to provide a robust structure and prevent possible noise.

In some embodiments, a spring 50 may be connected to the guide shaft 24 and the gap cover 10 to bias the gap cover 10 toward a retracted position to the package tray 12 (e.g., the position as shown in FIG. 2B). Thus, when the first magnetic connection part 14 is separated from the second magnetic connection part 18, the gap cover 10 is automatically retracted toward to the package tray 12 for a user to pick up the fallen object. Alternatively, the spring may be configured to bias the gap cover 10 toward an extended position (e.g., the position as shown in FIG. 2A). The spring force in this embodiment facilitates the connection between the first and second magnetic connection parts 14, 18, which can be realized by a smaller magnetic force.

Figure 4:
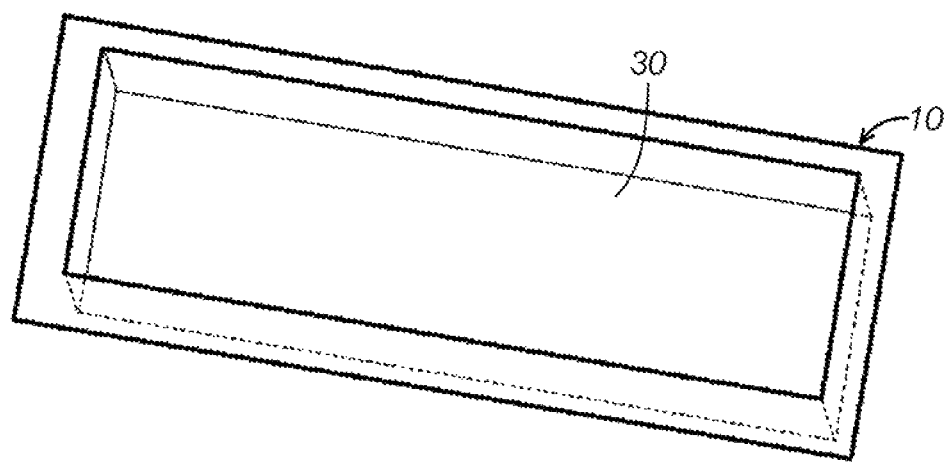
FIG. 4 is a schematic view of a gap cover of a gap cover assembly according to one embodiment of the present disclosure.

Referring to FIG. 4 and with further reference to FIGS. 2A and 2B, in some embodiments, the gap cover 10 includes a recess 30 recessed from a surface for user to store items such as a cell phone. In one embodiment, the recess 30 further includes a lid. Further, the recess 30 may include other structures, such as a divider, a holder for storing small items such as a cell phone and/or keys.

In some embodiments, the gap cover 10 is made from rigid material to support items having a certain weight and to provide strength to prevent the gap cover from being corrugated during movement. In some embodiments, the gap cover may be formed from a flexible material to lower its weight and reduce manufacturing cost.

In some embodiments, the first end 16 of the gap cover 10 includes a projection protruded from a top surface. In other words, the protrusion is formed as a handle adjacent to the first end 16 of the gap cover 10. If an object has fallen into the gap between the seat 40 and package tray 12, the user can easily separate the first and second magnetic connection parts 14 and 18 by pushing the handle to retrieve the object. It should be understood that the projection formed as a handle and the recess 30 are configured with the dimensions not to impede a normal movement of the gap cover 10 relative to the package tray 12.

In some embodiments, the first end 16 of the gap cover 10 includes a buffer layer to wrap the first magnetic connection part 14. The buffering layer can reduce noise caused by the contact between the gap cover 10 and the seatback 42, and buffer the magnetic force between the two magnetic parts.

As shown in FIGS. 2A and 2B, according to another aspect, a vehicle is provided. The vehicle comprises a pivotable rear seat 40, a package tray 12 spaced apart from the rear seat 40, and a gap cover assembly 8. The gap cover assembly 8 includes a gap cover 10 partially covered by the package tray 12 and is extendable relative to a front end 44 of the package tray 12, a first magnetic connection part 14 disposed on a first end 16 of the gap cover 10, a second magnetic connection part 18 disposed on a back side 46 of a seatback 42 of the vehicle and detachably connected with first magnetic connection part 14. The first end 16 of the gap cover 10 extends from a front end 44 of the package tray 12.

The gap cover assembly includes a first magnetic connection part 14 and a second magnetic connection part 18, which cooperate to connect the gap cover 10 to the back side 46 of the seat 40 to conceal a gap between the rear seat 40 and package tray 12. When the seat 40 reclines, the first magnetic connection part 14 slides on the back side 46 of the seat 40 to keep the gap cover 10 connected with the rear seat 40. When an object has fallen into the gap, the first magnetic connection part 14 and the second magnetic connection part 18 are easily separated for user to retrieve the fallen object.

Referring to FIGS. 2A and 2B, in one embodiment, the rear seat 40 is pivotable between a first position (e.g., the position as shown in FIG. 2A) and a second position (e.g., the position as shown in FIG. 2B) reclined relative to the first position to drive the gap cover 10 magnetically connected to the rear seat to extend and retract relative to the package tray 12. Thus, the gap cover 10 remains contact with the rear seat 40 to conceal the gap between the rear seat 40 and the package tray 12 during the movement of the rear seat 40 movement.

Figure 5:
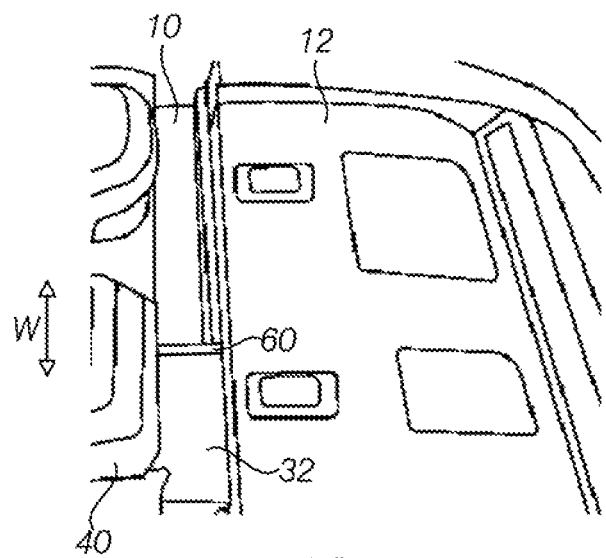
FIG. 5 is an overhead perspective view of a gap cover assembly in a vehicle according to another embodiment of the present disclosure.

Referring to FIG. 5, in some embodiments, a side of the package tray 12 includes a side cover 32 extending toward the rear seat 40, and the side cover 32 includes a guide groove 60. An edge portion of the gap cover 10 is slidably received in the guide groove 60. The guide groove 60 may be a recess facing the edge portion of the gap cover 10 to form a rail cooperating with the edge portion of the gap cover 10 to further facilitate smooth movement of the gap cover 10. Further, such configuration can assist the guide bracket 20 to support the gap cover 10. In some embodiments, one guide bracket 20 or all guide brackets 20 may be omitted when the package tray 12 includes the side cover 32 which has the guide groove 60.

In some embodiments, the first magnetic connection part 14 is a permanent magnet disposed on the first end 16 of the gap cover 10, and the second magnetic connection part 18 is a metal plate disposed on a back side 46 side of the seatback 42 and made from ferromagnetic material. In other embodiments, the first magnetic connection part 14 is made from ferromagnetic material such as iron or steel and the second magnetic connection part 18 is a permanent magnet. In some embodiments, both the first and second magnetic connection parts 14 and 18 include permanent magnets.

The gap cover assembly and the vehicle including the same are described with reference to FIGS. 2A to 5. It should be understood that the embodiments described above can be combined to form other embodiments that are not shown in the figures. In addition, the embodiments described with the reference to the gap cover assembly can be applied in the vehicle of the present disclosure. Similarly, the embodiments illustrated with reference to a vehicle can be applied to the gap cover assembly. For example, the configuration of the guide bracket 20 of the gap cover assembly illustrated in FIGS. 2A and 2B can be applied in a vehicle of the present invention. Likewise, the side cover 32 illustrated with reference to the vehicle can be combined into the gap cover assembly.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A gap cover assembly in a vehicle, comprising:
a gap cover, wherein the gap cover is disposed under a package tray adjacent to a rear window of the vehicle;
a first magnetic connection part, wherein the first magnetic connection part is disposed on a first end of the gap cover and the first end is adjacent to a seatback of a rear seat of the vehicle; and
a second magnetic connection part, wherein the second connection magnetic part is disposed on a rear side of the seatback and coupled to the first magnetic connection part,
wherein the gap cover is connected to the seatback of the rear seat via a magnetic field between the first and second magnetic connection parts and is moveable relative to a front end of the package tray,
wherein the first magnetic connection part is a permanent magnet connected to the first end of the gap cover, and the second magnetic connection part is made from ferromagnetic material and
wherein the second magnetic connection part is a metal plate including ferromagnetic material and disposed inside the seatback, and wherein the metal plate has a width extending along a widthwise direction of the seatback and a length at a height direction of the seatback, wherein the second magnetic connection part is located adjacent to a too end of the seatback, and wherein the length is configured to be greater than a moving path of the seatback relative to the first magnetic connection part.

2. The gap cover assembly of claim 1, wherein the first magnetic connection part includes an elongated permanent magnet connected to the first end of the gap cover or includes a plurality of permanent magnets spaced apart and connected to the first end of the gap cover.

3. The gap cover assembly of claim 1, wherein the first magnetic connection part has a hemispheric shape at a side facing the second magnetic connection part, is fixed on the first end, and is moveable on the seatback as the seatback reclines.

4. The gap cover assembly of claim 1, wherein the gap cover is configured to translate between an extended position and a retracted position, wherein the first end of the gap cover is further away from a front end of the package tray at the extended position and the first end of the gap cover is closer to the front end of the package tray at the retracted position.

5. A gap cover assembly in a vehicle, comprising:
a gap cover, wherein the gap cover is disposed under a package tray adjacent to a rear window of the vehicle;
a first magnetic connection part, wherein the first magnetic connection part is disposed on a first end of the gap cover and the first end is adjacent to a seatback of a rear seat of the vehicle;
a second magnetic connection part, wherein the second connection magnetic part is disposed on a rear side of the seatback and coupled to the first magnetic connection part, wherein the can cover is connected to the seatback of the rear seat via a magnetic field between the first and second magnetic connection parts and is moveable relative to a front end of the package tray; and
a guide bracket under the package tray, wherein the gap cover is supported on the guide bracket and is moveable relative to the guide bracket.

6. The gap cover assembly of claim 5, wherein the gap cover includes a guide groove on a lower surface and the guide groove is disposed along an extending and retracting direction of the gap cover relative to the package tray.

7. The gap cover assembly of claim 6, wherein the guide bracket includes a protrusion, a guide shaft raised from the protrusion, and a stop on an end of the guide shaft, wherein the guide shaft is received in the guide groove, and wherein a width of the guide groove is smaller than a cross-sectional width of the protrusion and the stop.

8. The gap cover assembly of claim 6, wherein the guide bracket is connected to a frame under the package tray.

9. The gap cover assembly of claim 6, wherein the guide bracket further includes a first guide bracket and a second guide bracket spaced apart from the first guide bracket, wherein the first guide bracket and the second guide bracket are disposed under the package tray and covered by the package tray.

10. The gap cover assembly of claim 7, further comprising a spring connected to the guide shaft and the gap cover to bias the gap cover at a direction to be retracted toward the package tray.

11. The gap cover assembly of claim 7, wherein the gap cover includes a recess on an outer surface for retaining an object, wherein the gap cover is formed from rigid material.

12. A vehicle, comprising:
- a pivotable rear seat,
- a package tray spaced apart from the rear seat; and
- a gap cover assembly including:
  - a gap cover disposed under the package tray;
  - a first magnetic connection part, wherein the first magnetic connection part is connected to a first end of the gap cover, and
  - a second magnetic connection part, wherein the second connection magnetic part is disposed on a rear side of a seatback of the rear seat,
- wherein the first magnetic connection part is a permanent magnet and coupled with the second magnetic connection part via magnetic force, and wherein the gap cover moves as the rear seat reclines while maintaining a connection with the seatback of the rear seat,
- wherein the second magnetic connection part is a metal plate including ferromagnetic material and disposed on the seatback, and wherein the metal plate has a width extending along a widthwise direction of the seatback and a length at a height direction of the seatback, and wherein the second magnetic connection part is located adjacent to a top end of the seatback, and wherein the length is configured to be greater than a moving path of the seatback relative to the first magnetic connection part.

13. The vehicle of claim 12, wherein an end of the package tray includes a side cover extending toward the rear seat, and the side cover includes a guide groove, and wherein an edge portion of the gap cover is slidably received in the guide groove.

* * * * *